(12) United States Patent
Akimoto

(10) Patent No.: US 11,243,643 B2
(45) Date of Patent: Feb. 8, 2022

(54) TOUCH SENSOR AND DISPLAY DEVICE

(71) Applicant: Japan Display Inc., Minato-ku (JP)

(72) Inventor: Hajime Akimoto, Minato-ku (JP)

(73) Assignee: Japan Display Inc., Minato-ku (JP)

(*) Notice: Subject to any disclaimer, the term of this patent is extended or adjusted under 35 U.S.C. 154(b) by 0 days.

(21) Appl. No.: 16/837,055

(22) Filed: Apr. 1, 2020

(65) Prior Publication Data
US 2020/0225789 A1 Jul. 16, 2020

Related U.S. Application Data

(63) Continuation of application No. PCT/JP2018/031426, filed on Aug. 24, 2018.

(30) Foreign Application Priority Data

Oct. 5, 2017 (JP) .............................. JP2017-195257

(51) Int. Cl.
  *G06F 3/044* (2006.01)
  *G06F 3/041* (2006.01)
(52) U.S. Cl.
  CPC ............ *G06F 3/044* (2013.01); *G06F 3/0414* (2013.01); *G06F 2203/04106* (2013.01)
(58) Field of Classification Search
  None
  See application file for complete search history.

(56) References Cited

U.S. PATENT DOCUMENTS

| 10,467,449 B2* | 11/2019 | Jang ....................... G06F 3/0446 |
| 2012/0105081 A1 | 5/2012 | Shaikh et al. |
| 2015/0060817 A1 | 3/2015 | Sato et al. |

(Continued)

FOREIGN PATENT DOCUMENTS

| JP | 2009-251785 A | 10/2009 |
| JP | 2015-50245 A | 3/2015 |
| JP | 2017-84138 A | 5/2017 |

OTHER PUBLICATIONS

International Search Report dated Oct. 9, 2016 in PCT/JP2018/031426 filed on Aug. 24, 2018, citing documents AD-AE and AP-AQ therein, 3 pages.

(Continued)

*Primary Examiner* — Brian M Butcher
(74) *Attorney, Agent, or Firm* — Oblon, McClelland, Maier & Neustadt, L.L.P.

(57) ABSTRACT

A touch sensor is a capacitive touch sensor including a touch detection area that includes a plurality of drive electrodes and a plurality of detection electrodes, and includes a plurality of drive signal lines extending in the Y-axis direction and arranged in the X-axis direction, and a plurality of detection signal lines extending in the X-axis direction and arranged in the Y-axis direction. The touch detection area includes a fingerprint detection area F in which an interval between a plurality of drive signal lines and an interval between a plurality of detection signal lines are narrow, and the detection signal lines include fingerprint authentication signal lines disposed in a fingerprint authentication area and detection signal lines disposed to be electrically separated from the fingerprint authentication signal lines in an area, which is adjacent to the fingerprint authentication area in the X-axis direction, of the touch detection area.

21 Claims, 8 Drawing Sheets

(56) References Cited

U.S. PATENT DOCUMENTS

| | | |
|---|---|---|
| 2017/0123566 A1 | 5/2017 | Noguchi |
| 2017/0222180 A1 | 8/2017 | Sato et al. |
| 2019/0109296 A1 | 4/2019 | Sato et al. |

OTHER PUBLICATIONS

Japanese Office Action dated Feb. 9, 2021 in Japanese Patent Application No. 2017-195257 (with computer generated English translation), 7 pages.

* cited by examiner

TOUCH SENSOR AND DISPLAY DEVICE

CROSS-REFERENCE TO RELATED APPLICATION

This application is a continuation application of International Application PCT/JP2018/031426 filed on Aug. 24, 2018, which claims priority from Japanese patent application JP2017-195257 filed on Oct. 5, 2017. The contents of these applications are incorporated herein by reference in their entirety.

BACKGROUND OF THE INVENTION

1. Field of the Invention

The present invention relates to a touch sensor and a display device.

2. Description of the Related Art

In recent years, there is known a projection-type electrostatic capacitive touch sensor including a touch detection area in which a plurality of drive electrodes and a plurality of detection electrodes are disposed (for example, JP 2015-050245 A).

Here, there is a demand for providing a touch sensor with a fine detection function such as a fingerprint authentication function. For that purpose, it is necessary to make the electrodes minute and increase the number of wirings connecting those electrodes. As the number of wirings increases, it becomes necessary to increase a width of a peripheral area of a touch detection area in order to dispose the wirings. When the number of wirings is increased and an interval between the wirings is narrowed, occurrence of parasitic capacitance unintended by a user becomes a problem.

SUMMARY OF THE INVENTION

An object of the present invention is to realize a narrower frame while suppressing the occurrence of parasitic capacitance in a touch sensor having a fine detection function.

According to an aspect of the present invention, there is provided a touch sensor which is a capacitive touch sensor including a touch detection area that includes a plurality of detection electrodes and a plurality of drive electrodes, and includes a plurality of drive signal lines electrically connected to the drive electrodes, extending in a first direction in the touch detection area, and arranged in a second direction intersecting the first direction, and a plurality of detection signal lines electrically connected to the detection electrodes, extending in the second direction in the touch detection area, and arranged in the first direction, in which the touch detection area includes an area where an interval between the plurality of drive signal lines and an interval between the plurality of detection signal lines are narrow, and the detection signal lines include first signal lines disposed in the area where the interval is narrow and second signal lines disposed to be electrically separated from the first signal line, in an area, which is adjacent to the area where the interval is narrow in the second direction, of the touch detection area.

DETAILED DESCRIPTION OF THE INVENTION

Figure 1:
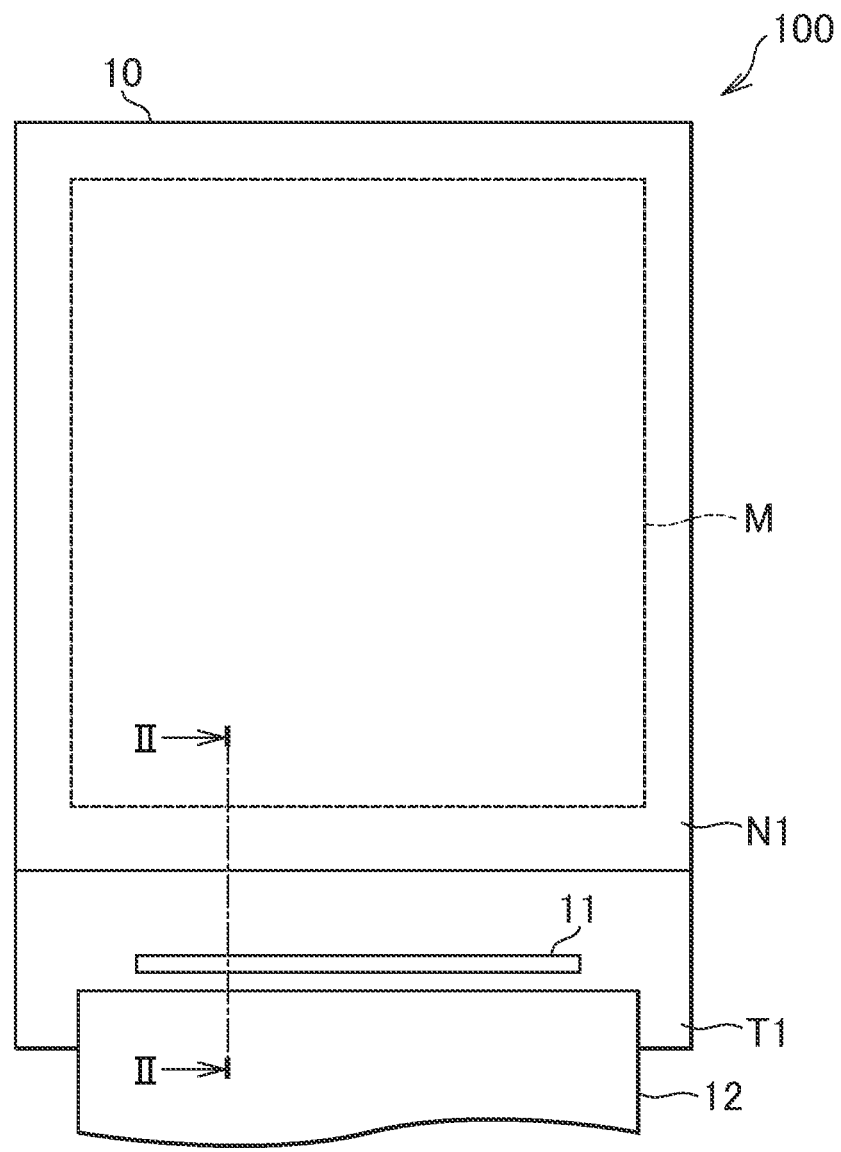
FIG. 1 is a plan view schematically illustrating an entire configuration of a display device according to a first embodiment.

Hereinafter, embodiments of the present invention will be described with reference to the drawings. However, the present invention can be implemented in various modes without departing from the gist of the present invention, and is not to be interpreted as being limited to description contents of the embodiments exemplified below.

The drawings may be schematically illustrated with respect to the width, thickness, shape, and the like of each portion as compared with actual modes in order to make the description clearer, but are merely examples, and do not limit the interpretation of the present invention. In the present specification and each drawing, elements having the same functions as those described in relation to the already described drawings are denoted by the same reference numerals, and redundant description thereof may be omitted.

Furthermore, in the embodiments, when defining a positional relationship between a certain component and another component, the terms "above" and "below" include not only a case where a component is positioned directly above or directly below a certain component, but also a case where another component is interposed between the components unless otherwise specified.

Figure 2:
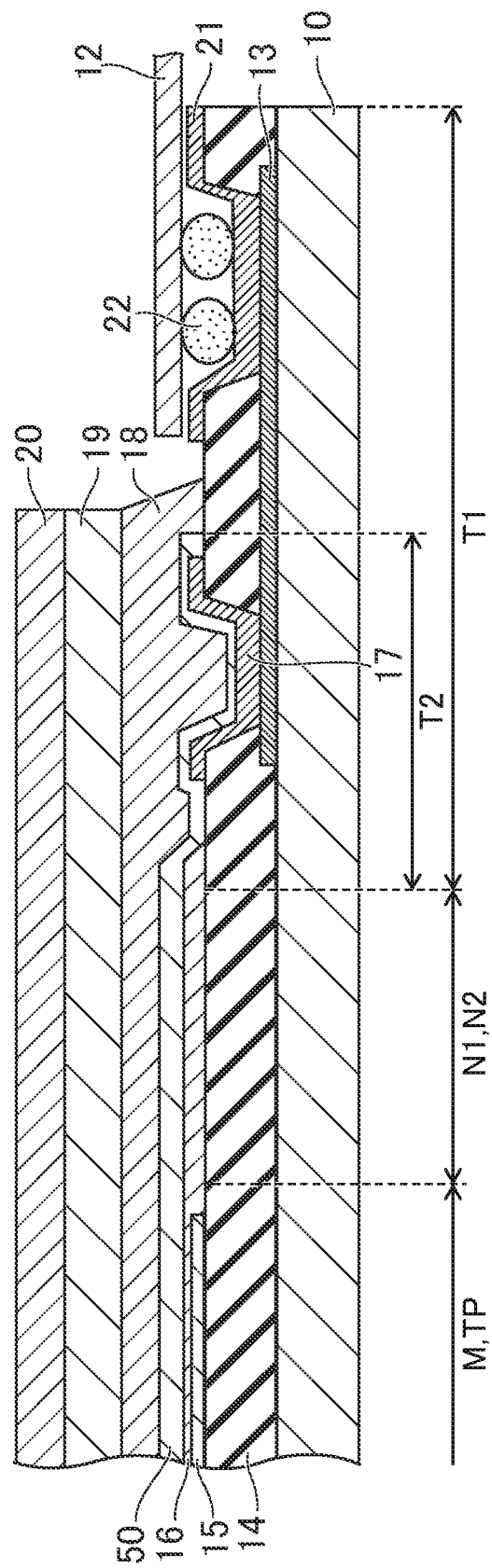
FIG. 2 is a cross-sectional view illustrating a cross section taken along line II-II of FIG. 1.

FIG. 1 is a plan view schematically illustrating an entire configuration of a display device according to a first embodiment. FIG. 2 is a cross-sectional view illustrating a cross section taken along line II-II of FIG. 1. In the first embodiment, as a display device 100, an organic electroluminescence (EL) display device on which a touch sensor 50 is mounted will be described as an example. However, the display device 100 is not limited thereto, and may be a liquid crystal display device or the like. The display device 100 is configured to include, for example, pixels of a plurality of colors including red, green, and blue, and display a full-color image.

The display device 100 includes a substrate 10 having, for example, a rectangular outer shape. The substrate 10 is made of polyimide resin, polyethylene terephthalate, or the like, and preferably has flexibility. The substrate 10 includes a display area M in which a plurality of pixels are disposed in a matrix shape. The substrate 10 includes a peripheral area N1 surrounding the display area M from four sides and a terminal area T1 adjacent to one side of the peripheral area N1. In the terminal area T1, a driver integrated circuit (IC) 11 for driving an element for displaying an image and a flexible printed circuit (FPC) 12 are mounted. Although FIG.

1 illustrates the display area M having a rectangular planar shape, the present invention is not limited thereto.

As illustrated in FIG. 2, the touch sensor 50 is provided above the substrate 10 on a display surface side of the display area M. The touch sensor 50 detects that a user's finger or the like approaches or touches the display surface, and detects the position thereof. In the first embodiment, the touch sensor 50 will be described as a mutual electrostatic capacitive touch sensor, which is a type of the projection-type electrostatic capacitive touch sensor, but is not limited thereto, and may be another capacitive touch sensor as long as it performs touch detection based on a change in capacitance.

On the substrate 10, a connection wiring 13 for electrically connecting the touch sensor 50 and the flexible printed circuit 12 is provided. On the substrate 10 and the connection wiring 13, an insulating interlayer film 14 is provided. On the interlayer film 14, connection terminals 17 and 21 are provided. The connection terminals 17 and 21 are electrically connected to the connection wiring 13 via contact holes formed in the interlayer film 14. The flexible printed circuit 12 is adhered to the connection terminal 21 by a conductive adhesive 22.

In the display area M, an organic light-emitting diode (OLED) layer 15 is provided on the interlayer film 14. The OLED layer 15 is a layer including a light-emitting element that emits light by itself, and a structure thereof is well known in the art, and thus detailed illustration thereof is omitted. On the OLED layer 15, a sealing layer 16 for shielding the OLED layer 15 from moisture is provided. The sealing layer 16 may be formed by laminating an inorganic film made of SiN, $SiO_x$ or the like, an organic film made of acrylic resin or the like, and an inorganic film made of SiN, $SiO_x$ or the like. However, the sealing layer structure is not limited to this, and may be a single inorganic film or another structure including two or more layers.

Then, the touch sensor 50 is provided on the sealing layer 16. The touch sensor 50 is provided such that a touch detection area TP for performing touch detection overlaps the display area M of the substrate 10. An organic protective film 18 is provided on the touch sensor 50. On the organic protective film 18, a circularly polarizing film 19 is provided. Furthermore, a cover film 20 is provided on the circularly polarizing film 19.

Figure 3:
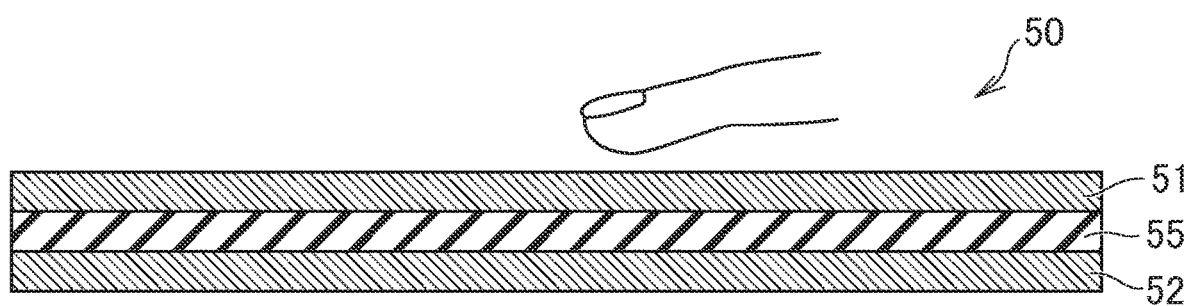
FIG. 3 is a cross-sectional view schematically illustrating an example of a cross section of a touch sensor according to the first embodiment.
Figure 4:
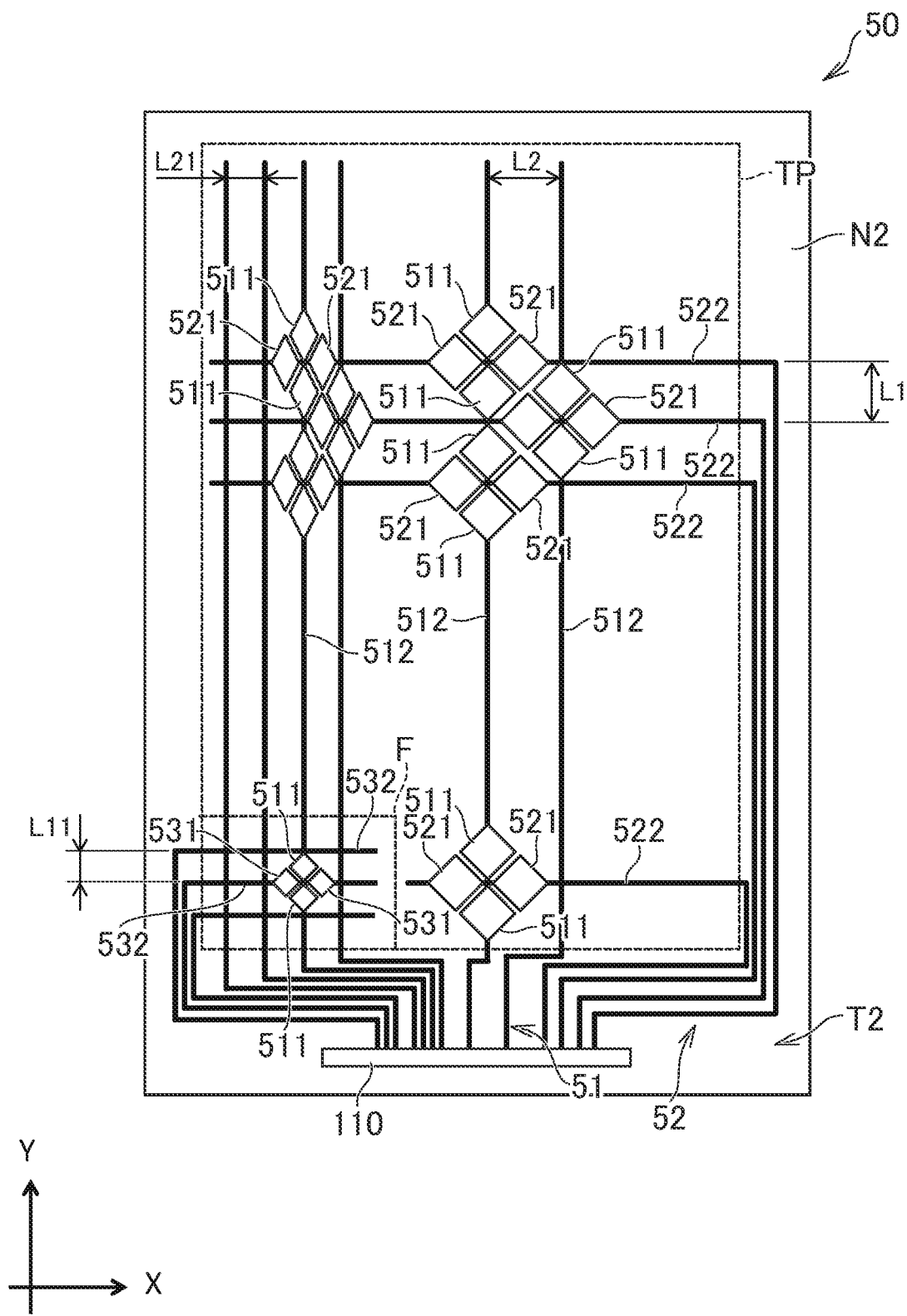
FIG. 4 is a plan view schematically illustrating an example of the touch sensor according to the first embodiment.

Next, a configuration of the touch sensor 50 will be described in detail with reference to FIGS. 3 and 4. FIG. 3 is a cross-sectional view schematically illustrating an example of a cross section of the touch sensor according to the first embodiment. FIG. 4 is a plan view schematically illustrating an example of the touch sensor according to the first embodiment.

As illustrated in FIG. 4, the touch sensor 50 includes a touch detection area TP for performing touch detection, a peripheral area N2 surrounding the touch detection area TP from four sides, and a terminal area T2 adjacent to one side of the peripheral area N2. The touch detection area TP is an area overlapping the display area M in plan view, the peripheral area N2 is in the same layer as the touch detection area TP and overlaps a peripheral area T1 in plan view, and the terminal area T2 is in the same layer as the touch detection area TP and overlaps the terminal area T1 in plan view. In the terminal area T2, a touch sensor integrated circuit (IC) 110 for controlling driving of the touch sensor 50 is provided. The touch sensor IC 110 may be provided separately from the driver IC 11, or may be provided integrally therewith. In FIG. 4, a direction along the short side of the touch detection area TP is defined as the X-axis direction, and a direction along the long side thereof is defined as the Y-axis direction.

As illustrated in FIG. 3, the touch sensor 50 includes a drive electrode pattern layer 51 and a detection electrode pattern layer 52, which are electrically separated via an insulating layer 55. However, the configuration of the touch sensor 50 is not limited thereto, and the drive electrode pattern layer 51 and the detection electrode pattern layer 52 may be formed in the same layer as long as they are disposed to be electrically separated. In that case, for example, drive electrodes 511 (see FIG. 4) adjacent to each other may be electrically connected via a bridge wiring that straddles a detection signal line 522 (see FIG. 4). Although illustration is omitted in FIG. 3, the organic protective film 18 is formed on the upper layer of the drive electrode pattern layer 51, and the sealing layer 16 is formed on the lower layer of the detection electrode pattern layer 52.

As illustrated in FIG. 4, the drive electrode pattern layer 51 includes the drive electrode 511 and a drive signal line 512 electrically connected to the drive electrode 511. A plurality of drive signal lines 512 are provided and a plurality of drive electrodes 511 are connected to each of the plurality of drive signal lines 512. The drive signal line 512 extends from the touch sensor IC 110 along the peripheral area N2 and is formed to be bent in the touch detection area TP so as to extend in the Y-axis direction. The plurality of drive signal lines 512 are provided side by side in the X-axis direction in the touch detection area TP. A drive signal output from the touch sensor IC 110 is input to the drive electrode 511 via the drive signal line 512. The drive electrode 511 may be made of a conductive material including Al, Ag, Cu, Ni, Ti, Mo, and the like. A detection electrode 521 to be described later may be made of the same conductive material.

The detection electrode pattern layer 52 includes a detection electrode 521 and the detection signal line 522 that is electrically connected to the detection electrode 521. A plurality of detection signal lines 522 are provided and a plurality of detection electrodes 521 are connected to each of the plurality of detection signal lines 522. The detection signal line 522 extends from the touch sensor IC 110 along the peripheral area N2, and is formed to be bent in the touch detection area TP so as to extend in the X-axis direction. The plurality of detection signal lines 522 are provided side by side in the Y-axis direction in the touch detection area TP. A detection signal output from the detection electrode 521 is input to the touch sensor IC 110 via the touch signal line 522.

FIG. 4 illustrates only apart of the drive electrodes 511, the drive signal lines 512, the detection electrodes 521, and the detection signal lines 522. Actually, the electrodes 511 and 521 and signal lines 512 and 522 are provided substantially over the entire touch detection area TP. The drive electrode 511 and the detection electrode 521 are disposed to be electrically separated from each other at intervals so as not to contact each other.

In the touch sensor 50, a drive signal is input from the touch sensor IC 110 to the drive electrode 511 through the drive signal line 512, and an electromagnetic field is generated between the drive electrode 511 and the detection electrode 521. Then, when the user's finger approaches the touch detection area TP, electrostatic capacitance changes due to the escape of the electromagnetic field to the finger. This change is output from the detection electrode 521 as a detection signal, and the output detection signal is input to the touch sensor IC 110 via the detection signal line 522. The touch sensor IC 110 detects presence and absence of a touch, a touch position, and the like based on the input detection signal.

Figure 5:
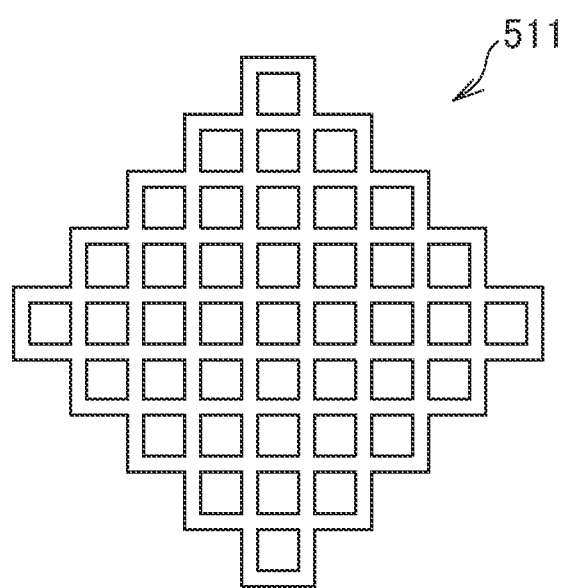
FIG. 5 is an enlarged plan view of a drive electrode according to the first embodiment.

FIG. 5 is an enlarged plan view of the drive electrode according to the first embodiment. The drive electrode 511 preferably has a substantially rectangular outer shape in plan view such as a rhombic shape. The drive electrode 511 may have a mesh-shaped structure as illustrated in FIG. 5. By arranging a light emitting area of the OLED layer 15 at a position overlapping an opening of the mesh-shaped drive electrode 511, light can be extracted to the outside via the touch sensor 50. Although illustration is omitted, the detection electrode 521 may also have the same shape. When these electrodes are made of a light-transmitting conductive material such as indium tin oxide (ITO), the electrodes may be formed in a so-called solid form instead of a mesh shape.

Furthermore, details of the configuration of the touch sensor 50 of the first embodiment will be described. The touch sensor 50 includes a fingerprint authentication area F in a part of the touch detection area TP. The fingerprint authentication area F is provided to identify that the user of the display device 100 is the owner of the display device 100 by detecting irregularity of the fingerprint.

The detection electrode pattern layer 52 is also disposed in the fingerprint authentication area F. In the following description, a detection electrode disposed in the fingerprint authentication area F is referred to as a fingerprint authentication electrode 531, and the detection electrode disposed in an area, which is other than the fingerprint authentication area F, of the touch detection area TP is simply referred to as the detection electrode 521. A detection signal line (first signal line) disposed in the fingerprint authentication area F is referred to as fingerprint authentication signal lines 532, and a detection signal line (second signal line) disposed in an area, which is other than the fingerprint authentication area F, of the touch detection area TP is simply referred to as the detection signal lines 522.

A plurality of fingerprint authentication signal lines 532 are provided, and a plurality of fingerprint authentication electrodes 531 are electrically connected to each of the plurality of fingerprint authentication signal lines 532. The fingerprint authentication signal line 532 extends from the touch detection IC 110 along the peripheral area N2, and is formed to be bent in the fingerprint authentication area F so as to extend in the X-axis direction. The plurality of fingerprint authentication signal lines 532 are provided side by side in the Y-axis direction in the fingerprint authentication area F.

The fingerprint authentication signal line 532 is provided along the peripheral area N2 on the opposite side with an area, where the detection signal line 522 is disposed, of the peripheral area N2 and the touch detection area TP interposed therebetween. Although the width of the peripheral area N2 becomes large and it becomes difficult to realize a narrow frame when the fingerprint authentication signal line 532 and the detection signal line 522 are provided along the peripheral area N2 on the same side, such a problem is unlikely to occur in the configuration of the first embodiment.

In the first embodiment, an interval L11 between the fingerprint authentication signal lines 532 arranged in the Y-axis direction is narrower than an interval L1 between the detection signal lines 522 arranged in the Y-axis direction. Specifically, the interval L11 is set to about 0.1 mm, and the interval L1 is set to about 4 mm. Accordingly, the size in plan view of the fingerprint authentication electrode 531 disposed in the fingerprint authentication area F is smaller than the size in plan view of the detection electrode 521.

In the first embodiment, apart of the drive electrodes 511 and drive signal lines 512 is included in the fingerprint authentication area F. Specifically, as illustrated in FIG. 4, a part of the drive signal lines 512 is provided to extend from the touch sensor IC 110 via the fingerprint authentication area F to an area, which is adjacent to the fingerprint authentication area F in the Y-axis direction, of the touch detection area TP.

In the fingerprint authentication area F illustrated in FIG. 4, only a part of the fingerprint authentication electrodes 531, the fingerprint authentication signal lines 532, the drive electrodes 511, and the drive signal lines 512 is illustrated. Actually, the electrodes 511 and 531 and signal lines 512 and 532 are provided in substantially the entire area of the fingerprint authentication area F. In the fingerprint authentication area F, the fingerprint authentication electrode 531 and the drive electrode 511 are disposed to be electrically separated from each other at intervals so as not to contact each other.

An interval L21 between the drive signal lines 512 included in the fingerprint authentication area F among the drive signal lines 512 is narrower than an interval L2 between the drive signal lines 512 not included in the fingerprint authentication area F. Specifically, the interval L21 is set to about 0.1 mm, and the interval L2 is set to about 4 mm. Accordingly, the size in plan view of the drive electrode 511 included in the fingerprint authentication area F is smaller than the size in plan view of the drive electrode 511 not included in the fingerprint authentication area F.

As such, in the fingerprint authentication area F, the electrodes to be disposed are made minute and disposition density is increased, thereby enabling finer detection than the area, which is other than the fingerprint authentication area F, of the touch detection area TP. That is, it is possible to authenticate a fingerprint composed of minute irregularities.

The sizes of the drive electrode 511, the detection electrode 521, and the fingerprint authentication electrode 531 may be respectively set according to wiring intervals in the areas where the electrodes 511, 521, and 531 are disposed. For example, the planar shape of the drive electrode 511 and the detection electrode 521 disposed in the area, which is adjacent to the fingerprint authentication area F in the Y-axis direction, of the touch detection area TP may have a rhombic shape whose longitudinal direction is the Y-axis direction. The rhombic shape having the longitudinal direction as the Y-axis direction is because the interval L1 between the detection signal lines 522 arranged in the Y-axis direction is wider than the interval L21 between the drive signal lines 512 passing through the fingerprint authentication area F and arranged in the X-axis direction.

As illustrated in FIG. 4, by disposing the fingerprint authentication area F at a corner of the touch detection area TP and at a position close to the touch sensor IC 110, the length of the fingerprint authentication signal line 532 can be shortened, and the occurrence of parasitic capacitance can be suppressed. However, the fingerprint authentication area F may be an area included in the touch detection area TP, and is not limited to the disposition and size illustrated in FIG. 4.

In the first embodiment, as illustrated in FIG. 4, the tip of the fingerprint authentication signal line 532 is provided in the fingerprint authentication area F. Then, in the area, which is adjacent to the fingerprint authentication area F in the X-axis direction, of the touch detection area TP, the tip of the detection signal line 522 is not disposed in the fingerprint authentication area F, but is provided so as to face the tip of the fingerprint authentication signal line 532. That is, the fingerprint authentication signal line 532 and the detection signal line 522 disposed in the area, which is adjacent to the fingerprint authentication area F in the X-axis direction, of the touch detection area TP are provided to be electrically separated from each other. With this configuration, the occurrence of parasitic capacitance can be suppressed, and the sensitivity of fingerprint authentication in the fingerprint authentication area F can be improved. On the other hand, the drive signal lines 512 provided in the fingerprint authentication area F is formed continuously from the fingerprint authentication area F to an area adjacent to the fingerprint authentication area F in the Y-axis direction. This is because the drive signal line 512 is a wiring for inputting a drive signal, and does not affect the accuracy of touch detection even if parasitic capacitance occurs.

In the first embodiment, with the configuration as described above, the touch sensor 50 having the fingerprint authentication function in the touch detection area TP can be realized without unnecessarily increasing the number of wirings. By shortening the length of the fingerprint authentication signal line 532 having a narrow disposition interval, the occurrence of parasitic capacitance can be suppressed, and the sensitivity of fingerprint authentication can be improved.

Figure 6:
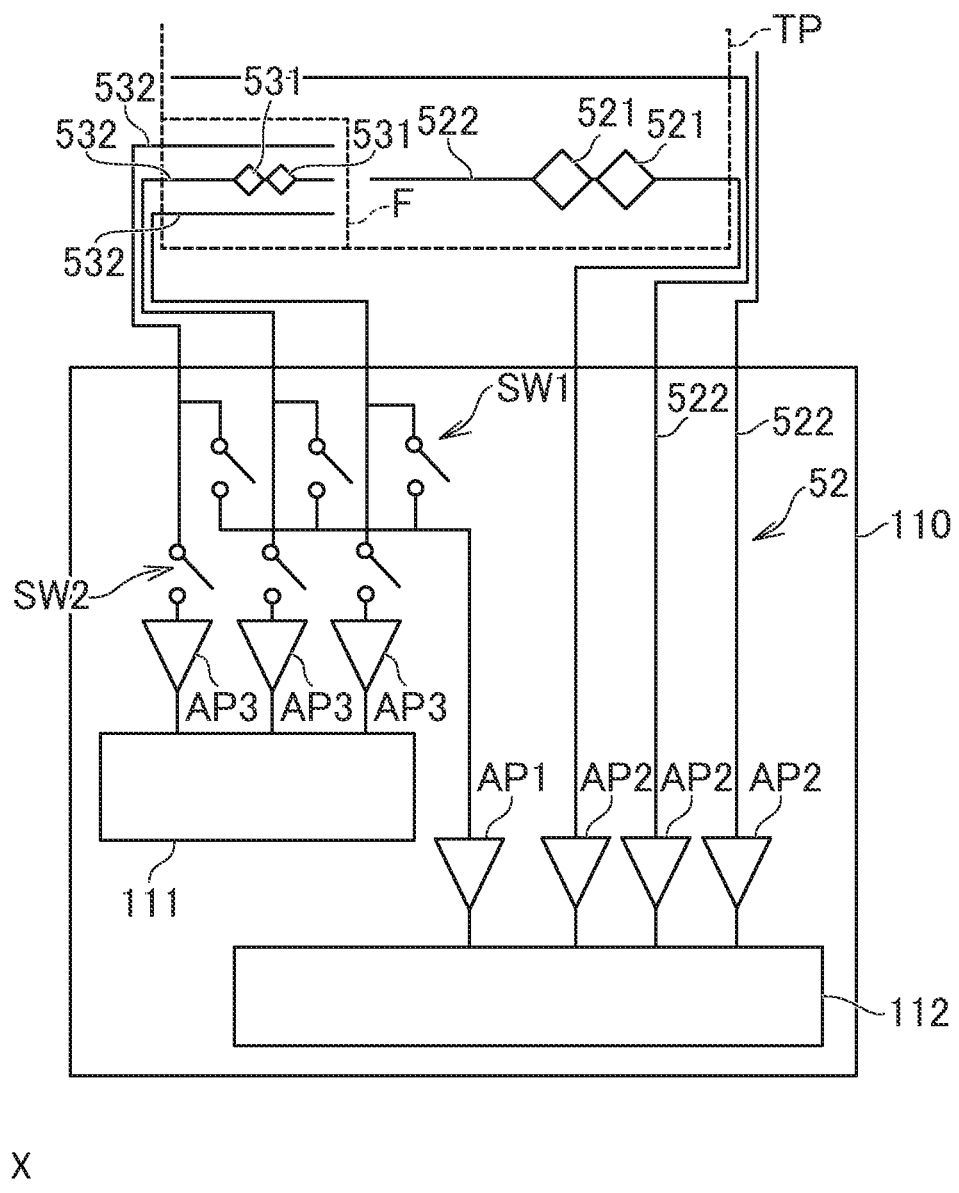
FIG. 6 is a diagram schematically illustrating detection signal lines and fingerprint authentication signal lines connected to a touch sensor IC.
Figure 7:
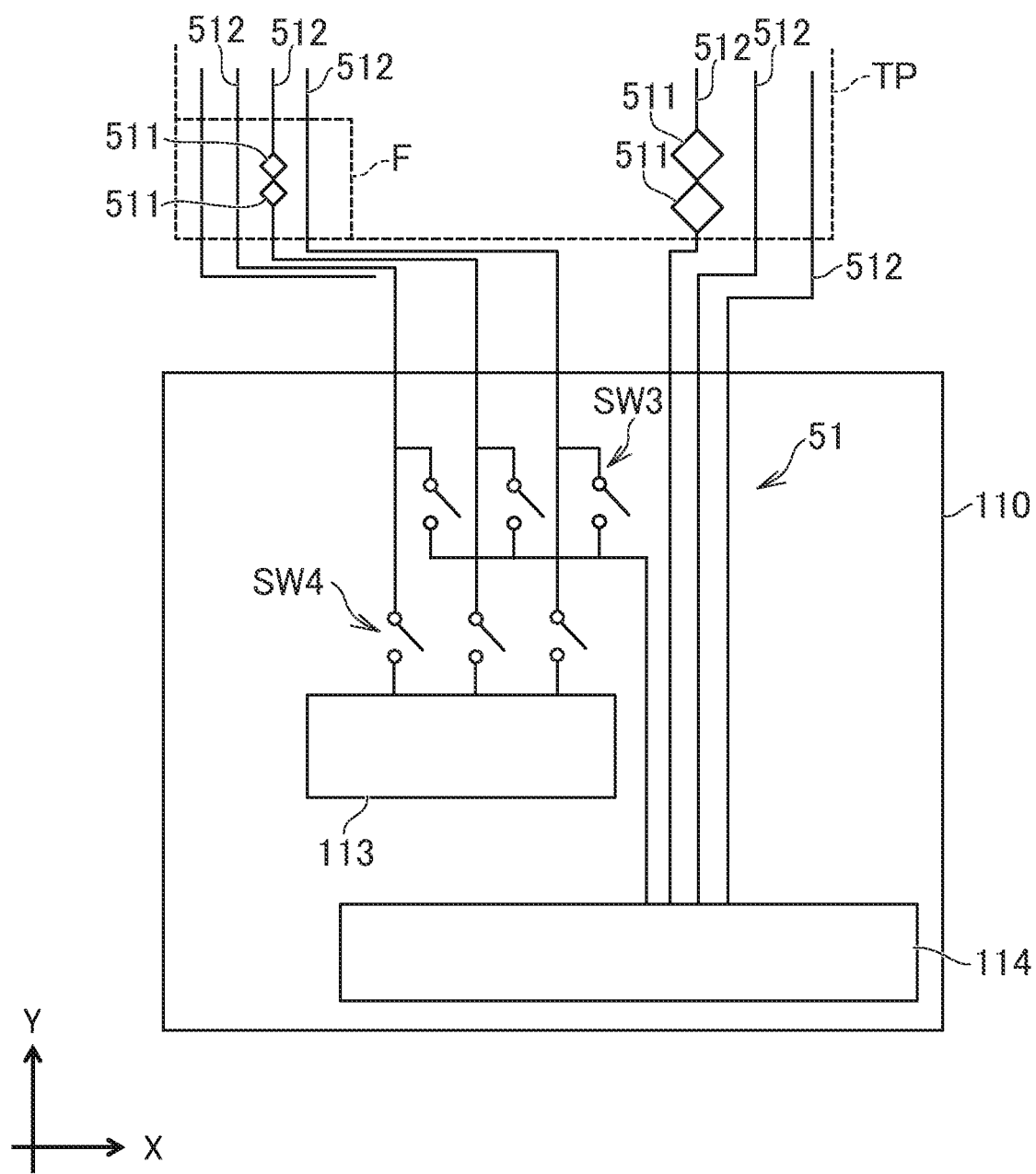
FIG. 7 is a diagram schematically illustrating drive signal lines connected to the touch sensor IC.

Here, the fingerprint authentication area F is an area included in the touch detection area TP, and exhibits a touch detection function except when fingerprint authentication is performed. That is, the fingerprint authentication electrode 531 and the fingerprint authentication signal line 532 have not only the fingerprint authentication function but also the same touch detection function as that of the detection electrode 521 and the detection signal line 522. A switching structure between the fingerprint authentication function and the touch detection function will be described with reference to FIGS. 6 and 7. FIG. 6 is a diagram schematically illustrating the detection signal lines and the fingerprint authentication signal lines connected to the touch sensor IC. FIG. 7 is a diagram schematically illustrating the drive signal lines connected to the touch sensor IC. In FIG. 6, illustrations of drive signal lines, a circuit to which the drive signal lines are connected, and the like are omitted. In FIG. 7, illustrations of the detection signal lines and the fingerprint authentication signal lines, the circuit to which the signal lines are connected, and the like are omitted.

The fingerprint authentication electrode 531 and the fingerprint authentication signal line 532 are used for fingerprint authentication in a fingerprint authentication mode, and are used for touch detection in a normal mode. Here, the fingerprint authentication mode is a mode for recognizing that the finger of the user who is the owner of the display device 100 or the like touches the fingerprint authentication area F. In the fingerprint authentication mode, use of various functions of the display device 100 is regulated. For example, when the user has not used the display device 100 for a certain period, the display device 100 enters the fingerprint authentication mode. When the user's finger touches the fingerprint authentication area F and is recognized as a fingerprint registered in advance, the mode is switched from the fingerprint authentication mode to the normal mode. The normal mode is a mode in which various functions of the display device 100 and the like can be used when the user's finger touches the touch detection area TP.

In a configuration in which the fingerprint authentication area F is included in the touch detection area TP, there is a possibility that the user may not know which position in the touch detection area TP to touch with a finger in order to perform fingerprint authentication. For that reason, the fingerprint authentication area F may be configured to emit light in the fingerprint authentication mode. With this configuration, the user can recognize the position of the fingerprint authentication area F, and can perform fingerprint authentication by touching alight emitting area of the touch detection area TP with a finger. Then, when the fingerprint authentication is completed and the mode is switched to the normal mode, the light emission may be turned OFF.

As illustrated in FIG. 6, the touch sensor IC 110 includes a fingerprint authentication circuit 111, which is a fine detection circuit, and a touch detection circuit 112. The fingerprint authentication circuit 111 is a circuit to which a fingerprint authentication signal output from the fingerprint authentication electrode 531 is input via the fingerprint authentication signal line 532, in the fingerprint authentication mode. The touch detection circuit 112 is a circuit to which a detection signal output from the touch detection electrode 521 is input via the detection signal line 522, and a detection signal output from the fingerprint authentication electrode 531 is input via the fingerprint authentication signal line 532, in the normal mode.

The detection signal line 522 is connected to the touch detection circuit 112, and the detection signal output from the detection electrode 521 is input to the touch detection circuit 112 via the detection signal line 522.

The fingerprint authentication signal line 532 is connected to the fingerprint authentication circuit 111 or the touch detection circuit 112 to be switchable by switches SW1 and SW2. The switches SW1 and SW2 may be formed of, for example, thin film transistors. When the switch SW1 is in an ON state and the switch SW2 is in an OFF state, the fingerprint authentication signal line 532 is connected to the touch detection circuit 112. When the switch SW1 is in an OFF state and the switch SW2 is in an ON state, the fingerprint authentication signal line 532 is connected to the fingerprint authentication circuit 111. In the fingerprint authentication mode, the switch SW1 is in the OFF state and the switch SW2 is in the ON state, and fingerprint authentication is performed in the fingerprint authentication area F. On the other hand, in the normal mode, the switch SW1 is in the ON state and the switch SW2 is in the OFF state, and touch detection is performed in the touch detection area TP including the fingerprint authentication area F.

In the first embodiment, as illustrated in FIG. 6, each of a plurality of fingerprint authentication signal lines 532 can be connected to the fingerprint authentication circuit 111. That is, in the fingerprint authentication mode, a fingerprint authentication signal is input to the fingerprint authentication circuit 111 through each fingerprint authentication signal line 532.

On the other hand, the plurality of fingerprint authentication signal lines 532 are combined into one wiring for every three wirings, and can be connected to the touch detection circuit 112. Here, although a configuration in which three fingerprint authentication signal lines 532 are combined into one wiring will be described with reference to FIG. 6, the three lines are merely examples and the present invention is not limited thereto.

In the normal mode, a detection signal is input to the touch detection circuit 112 through three fingerprint authentication signal lines 532 combined into one wiring. In the fingerprint authentication electrode 531 connected to any one of the fingerprint authentication signal lines 532 of the three fingerprint authentication signal lines 532 combined into one wiring, when there is a change in capacitance, it is preferable to output a detection signal from the fingerprint authentication electrode 531. Alternatively, when there is a change in capacitance in all of the fingerprint authentication electrodes 531 connected to the three fingerprint authentication signal lines 532 combined into one wiring, a detection signal may be output from all or any of the fingerprint authentication electrodes 531. With such a configuration, fine detection is possible in the fingerprint authentication mode, and in the normal mode, the fingerprint authentication area F can be made to function in the same manner as the area, which is other than the fingerprint authentication area F, of the touch detection area TP.

The detection signal line 522 is connected to the touch detection circuit 112 through an amplifier AP2. The fingerprint authentication signal line 532 is connected to the touch detection circuit 112 through an amplifier AP1, and is connected to the fingerprint authentication circuit 111 through an amplifier AP3. The amplifiers AP1, AP2, and A3 have different amplification factors. For example, the amplification factor of the amplifier AP3 connected to only one fingerprint authentication signal line 532 may be larger than that of the amplifiers AP1 and AP2.

As illustrated in FIG. 7, the touch sensor IC 110 further includes a fingerprint drive circuit 113 and a touch drive circuit 114. The fingerprint drive circuit 113 is a circuit that outputs a drive signal to the drive electrode 511 included in the fingerprint authentication area F via the drive signal line 512 in the fingerprint authentication mode. The touch drive circuit 114 is a circuit that outputs a drive signal to the drive electrode 511 via the drive signal 512 in the normal mode.

The drive signal line 512, which is not included in the fingerprint authentication area F, among the drive signal lines 512 is connected to the touch drive circuit 114, and the drive signal output from the touch drive circuit 114 is input to the drive electrode 511 via the drive signal line 512.

The drive signal line 512, which is included in the fingerprint authentication area F, among the drive signal lines 512 is connected to the fingerprint drive circuit 113 or the touch drive circuit 114 to be switchable by switches SW3 and SW4. The switches SW3 and SW4 may be formed of, for example, thin film transistors. When the switch SW3 is in an ON state and the switch SW4 is in an OFF state, the drive signal line 512 included in the fingerprint authentication area F is connected to the touch drive circuit 114. When the switch SW3 is in an OFF state and the switch SW4 is in an ON state, the drive signal line 512 included in the fingerprint authentication area F is connected to the fingerprint drive circuit 113. In the fingerprint authentication mode, the switch SW3 is in the OFF state and the switch SW4 is in the ON state, and fingerprint authentication is performed in the fingerprint authentication area F. On the other hand, in the normal mode, the switch SW3 is in the ON state and the switch SW4 is in the OFF state, and touch detection is performed in the touch detection area TP including the fingerprint authentication area F.

In the first embodiment, as illustrated in FIG. 7, each of the drive signal lines 512 included in the fingerprint authentication area F can be connected to the fingerprint drive circuit 113. That is, in the fingerprint authentication mode, a drive signal is output from the fingerprint drive circuit 113 to each drive signal line 512.

On the other hand, the drive signal lines 512 included in the fingerprint authentication area F are combined into one wiring for every three wirings and can be connected to the touch drive circuit 114. Here, although a configuration in which three drive signal lines 512 are combined into one wiring will be described with reference to FIG. 7, the three lines are merely examples, and the present invention is not limited thereto. In the normal mode, the drive signals are combined to be output from the touch drive circuit 114 to the three drive signal lines 512 combined into one wiring.

Figure 8:
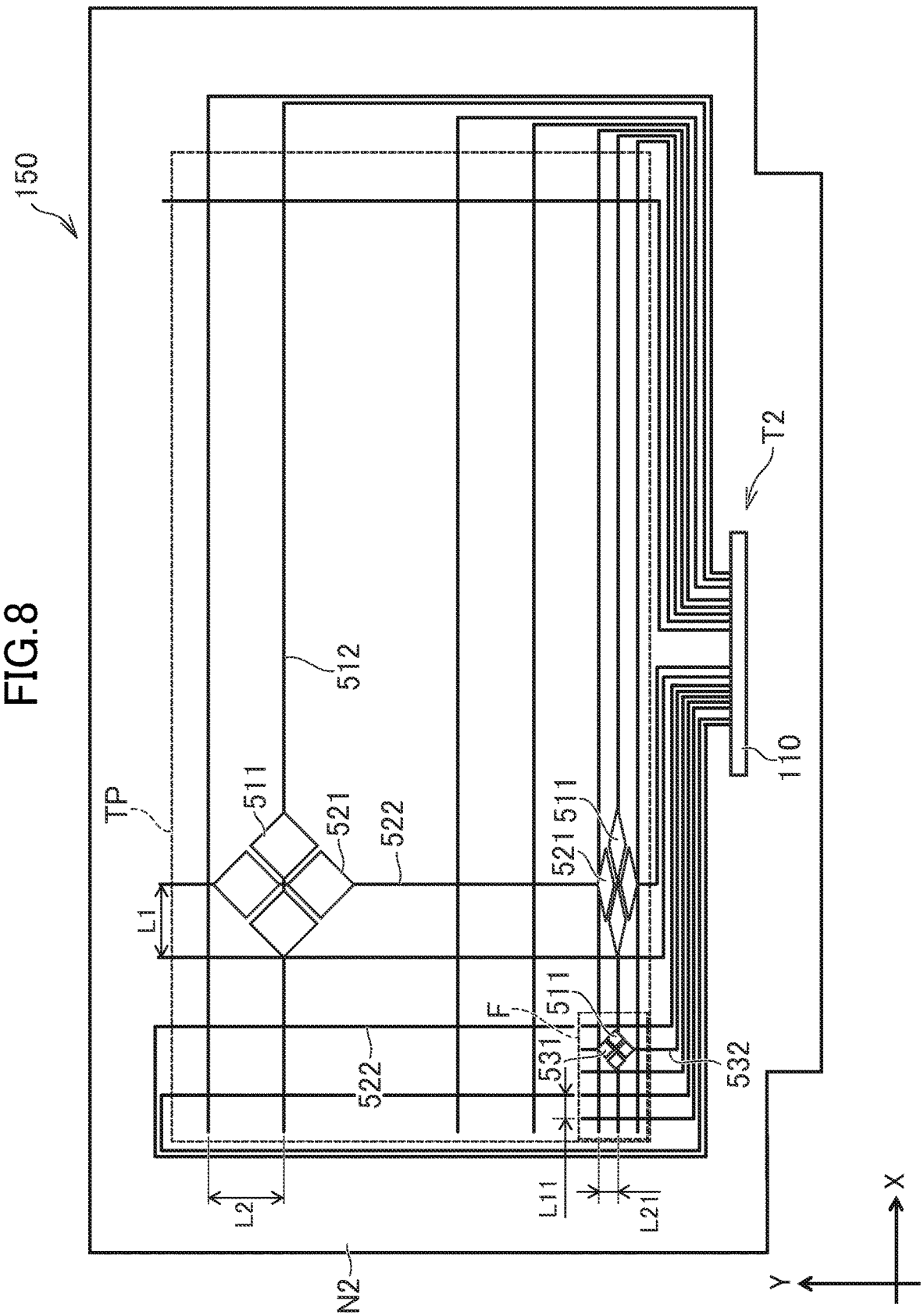
FIG. 8 is a plan view schematically illustrating an example of a touch sensor according to a second embodiment.

A touch sensor 150 according to the second embodiment will be described with reference to FIG. 8. The configurations having the same functions as those of the touch sensor 50 are denoted by the same reference numerals, and a detailed description thereof will be omitted. FIG. 8 is a plan view schematically illustrating the touch sensor according to the second embodiment. In the second embodiment, a touch sensor in which the longitudinal direction of the touch detection area TP is the X-axis direction and the lateral direction thereof is the Y-axis direction will be described.

The touch sensor 150 includes a drive electrode pattern layer including the drive electrode 511 and the drive signal line 512, and a detection electrode pattern layer including the detection electrode 521 and the detection signal line 522. The drive signal line 512 extends from the touch sensor IC 110 along the peripheral area N2, and is formed to be bent in the touch detection area TP so as to extend in the X-axis direction. The detection signal line 522 extends from the touch sensor IC 110 along the peripheral area N2, and is formed to be bent in the touch detection area TP so as to extend in the Y-axis direction.

The touch detection area TP includes the fingerprint authentication area F as a part thereof. In the fingerprint authentication area F, a fingerprint authentication electrode pattern layer including the fingerprint authentication electrode 531 and the fingerprint authentication signal line 532 is provided. The fingerprint authentication signal line 532 extends from the touch sensor IC 110 along the peripheral area N2, and is formed to be bent in the fingerprint authentication area F so as to extend in the Y-axis direction.

In the second embodiment, as illustrated in FIG. 8, the tip of the fingerprint authentication signal line 532 is provided in the fingerprint authentication area F. Then, in the area, which is adjacent to the fingerprint authentication area F in the Y-axis direction, of the touch detection area TP, the tip of the detection signal line 522 is not disposed in the fingerprint authentication area F, but is provided so as to face the tip of the fingerprint authentication signal line 532. That is, the fingerprint authentication signal line 532 and the detection signal line 522 disposed in the area, which is adjacent to the fingerprint authentication area F in the Y-axis direction, of the touch detection area TP are provided to be electrically separated from each other. With this configuration, the occurrence of parasitic capacitance can be suppressed, and the sensitivity of fingerprint authentication in the fingerprint authentication area F can be improved. On the other hand, the drive signal lines 512 passing through the fingerprint authentication area F is formed continuously from an area adjacent to the fingerprint authentication area F in the X-axis direction to the fingerprint authentication area F. This is because the drive signal line 512 is a wiring for inputting a drive signal, and does not affect the accuracy of touch detection even if parasitic capacitance occurs.

In the second embodiment, the interval L11 between the fingerprint authentication signal lines 532 arranged in the X-axis direction is narrower than the interval L1 between the detection signal lines 522 arranged in the X-axis direction. Specifically, the interval L11 is set to about 0.1 mm, and the interval L1 is set to about 4 mm. Accordingly, the size in plan view of the fingerprint authentication electrode 531 disposed in the fingerprint authentication area F is smaller than the size in plan view of the detection electrode 521.

In the second embodiment, the fingerprint authentication area F is disposed at a corner of the touch detection area TP and at a position close to the touch sensor IC. With this configuration, the length of the fingerprint authentication signal line 532 can be shortened, and the occurrence of parasitic capacitance can be suppressed. However, the fingerprint authentication area F may be an area included in the touch detection area TP, and is not limited to the disposition and size illustrated in FIG. 8.

In the second embodiment, a configuration in which the detection signal line 522 is provided along one of the peripheral areas N2 sandwiching the touch detection area TP in the X-axis direction and the drive signal line 512 is provided along one of the peripheral areas N2 sandwiching the touch detection area TP in the X-axis direction is adopted. With this configuration, the size of the touch panel area TP can be increased in the X-axis direction.

As described above, in the second embodiment, even in a horizontally long display device such as an in-vehicle display, a fingerprint authentication function can be provided in the touch detection area.

The fingerprint authentication area F in the embodiments described above corresponds to an area in which an interval is narrow according to the present invention. The area in which the interval is narrow according to the present invention is not limited to the area where fingerprint authentication is performed, but may be any area as long as finer detection than the area, which is other than the area in which the interval is narrow, of the touch detection area can be performed.

While there have been described what are at present considered to be certain embodiments, it will be understood that various modifications may be made thereto, and it is intended that the appended claims cover all such modifications as fall within the true spirit and scope of the invention.

What is claimed is:

1. A touch sensor that is a capacitive touch sensor including a touch detection area that includes a plurality of detection electrodes and a plurality of drive electrodes, the touch sensor comprising:
   a plurality of drive signal lines electrically connected to the drive electrodes, extending in a first direction in the touch detection area, and arranged in a second direction intersecting the first direction; and
   a plurality of detection signal lines electrically connected to the detection electrodes, extending in the second direction in the touch detection area, and arranged in the first direction, wherein
   the touch detection area includes
      an area where an interval between the plurality of drive signal lines and an interval between the plurality of detection signal lines are narrow, and
   the detection signal lines include
      first signal lines disposed in the area where the interval is narrow, and
      second signal lines disposed to be electrically separated from the first signal lines, in an area, which is adjacent to the area where the interval is narrow in the second direction, of the touch detection area; and further comprising:
   a first peripheral area and a second peripheral area that are provided around the touch detection area and sandwich the touch detection area, wherein
   the first signal lines extend along the first peripheral area and are bent in the touch detection area so as to extend in the second direction, and
   the second signal lines extend along the second peripheral area and are bent in the touch detection area so as to extend in the second direction.

2. The touch sensor according to claim 1, wherein
a size in a plan view of one of the drive electrodes and one of the detection electrodes included in the area Where the interval is narrow is smaller than a size of one of the drive electrodes and one of the detection electrodes included in an area, which is other than the area where the interval is narrow, of the touch detection area.

3. The touch sensor according to claim 1, wherein
the drive electrodes and the detection electrodes included in an area adjacent to the area where the interval is narrow in the first direction have a rhombic shape having the first direction as the longitudinal direction in a plan view.

4. The touch sensor according to claim 1, wherein
a planar shape of the drive electrodes and the detection electrodes included in the area where the interval is narrow is the same as a planar shape of the drive electrodes and the detection electrodes included in an area adjacent to the area where the interval is narrow in the second direction.

5. The touch sensor according to claim 1, further comprising:
   a touch detection circuit;
   a fine detection circuit;
   a first switch that switches a connection state between the first signal lines and the touch detection circuit; and
   a second switch that switches a connection state between the first signal lines and the fine detection circuit, wherein
   when detection is performed in the area where the interval is narrow, the second switch switches the first signal lines and the fine detection circuit to a disconnected state, and the first switch switches the first signal lines and the touch detection circuit to a connected state.

6. The touch sensor according to claim 5, wherein
the first signal lines are combined into one wiring for each of the first signal lines and connected to the touch detection circuit.

7. The touch sensor according to claim 6, wherein
the touch detection circuit performs touch detection based on a change in capacitance of any one of the detection electrodes connected to the first signal lines combined into the one wiring.

8. The touch sensor according to claim 6, wherein
the touch detection circuit performs touch detection based on a change in capacitance of all of the detection electrodes connected to the first signal lines combined into the one wiring.

9. The touch sensor according to claim 1, wherein
the touch detection area is a rectangle having a long side and a short side,
the drive signal lines extend along the long side, and
the detection signal lines extend along the short side.

10. The touch sensor according to claim 1, wherein
the area where the interval is narrow is a fingerprint authentication area for identifying a user's fingerprint.

11. A display device comprising:
the touch sensor according to claim 1 mounted thereon; and
a display area in which a plurality of pixels are disposed, wherein the display area and a touch detection area are provided to overlap with each other.

12. A touch sensor that is a capacitive touch sensor including a touch detection area that includes a plurality of detection electrodes and a plurality of drive electrodes, the touch sensor comprising:
- a plurality of drive signal lines electrically connected to the drive electrodes, extending in a first direction in the touch detection area, and arranged in a second direction intersecting the first direction; and
- a plurality of detection signal lines electrically connected to the detection electrodes, extending in the second direction in the touch detection area, and arranged in the first direction, wherein
- the touch detection area includes
  - an area where an interval between the plurality of drive signal lines and an interval between the plurality of detection signal lines are narrow, and
- the detection signal lines include
  - first signal lines disposed in the area where the interval is narrow, and
  - second signal lines disposed to be electrically separated from the first signal lines; in an area, which is adjacent to the area where the interval is narrow in the second direction, of the touch detection area; and further comprising:
- a touch detection circuit;
- a fine detection circuit;
- a first switch that switches a connection state between the first signal lines and the touch detection circuit; and
- a second switch that switches a connection state between the first signal lines and the fine detection circuit, wherein
- when detection is performed in the area where the interval is narrow, the second switch switches the first signal lines and the fine detection circuit to a disconnected state, and the first switch switches the first signal lines and the touch detection circuit to a connected state.

13. The touch sensor according to claim 12, wherein
a size in a plan view of one of the drive electrodes and one of the detection electrodes included in the area where the interval is narrow is smaller than a size of one of the drive electrodes and one of the detection electrodes included in an area, which is other than the area where the interval is narrow, of the touch detection area.

14. The touch sensor according to claim 12, wherein
the drive electrodes and the detection electrodes included in an area adjacent to the area where the interval is narrow in the first direction have a rhombic shape having the first direction as the longitudinal direction in a plan view.

15. The touch sensor according to claim 12, wherein
a planar shape of the drive electrodes and the detection electrodes included in the area where the interval is narrow is the same as a planar shape of the drive electrodes and the detection electrodes included in an area adjacent to the area where the interval is narrow in the second direction.

16. The touch sensor according to claim 12, wherein
the first signal lines are combined into one wiring for each of the first signal lines and connected to the touch detection circuit.

17. The touch sensor according to claim 16, wherein
the touch detection circuit performs touch detection based on a change in capacitance of any one of the detection electrodes connected to the first signal lines combined into the one wiring.

18. The touch sensor according to claim 16, wherein
the touch detection circuit performs touch detection based on a change in capacitance of all of the detection electrodes connected to the first signal lines combined into the one wiring.

19. The touch sensor according to claim 12, wherein
the touch detection area is a rectangle having a long side and a short side,
the drive signal lines extend along the long side, and
the detection signal lines extend along the short side.

20. The touch sensor according to claim 12, wherein
the area where the interval is narrow is a fingerprint authentication area for identifying a user's fingerprint.

21. A display device comprising:
the touch sensor according to claim 12 mounted thereon; and
a display area in which a plurality of pixels are disposed, wherein the display area and a touch detection area are provided to overlap with each other.

\* \* \* \* \*